（12）United States Patent
Wiatr et al.

(10) Patent No.: US 8,456,224 B2
(45) Date of Patent: Jun. 4, 2013

(54) COMPENSATION OF OPERATING TIME-RELATED DEGRADATION OF OPERATING SPEED BY A CONSTANT TOTAL DIE POWER MODE

(75) Inventors: Maciej Wiatr, Dresden (DE); Richard Heller, Austin, TX (US); Rolf Geilenkeuser, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 167 days.

(21) Appl. No.: 12/577,985

(22) Filed: Oct. 13, 2009

(65) Prior Publication Data

US 2010/0109757 A1   May 6, 2010

(30) Foreign Application Priority Data

Oct. 31, 2008   (DE) .......................... 10 2008 054 067

(51) Int. Cl.
G05F 1/10 (2006.01)
G05F 3/02 (2006.01)

(52) U.S. Cl.
USPC ............ 327/535; 327/538; 327/540; 323/312

(58) Field of Classification Search
USPC ... 327/530, 534–538, 546, 543; 323/312–317
See application file for complete search history.

(56) References Cited

U.S. PATENT DOCUMENTS

| 6,424,184 | B1 * | 7/2002 | Yamamoto et al. | 327/102 |
|---|---|---|---|---|
| 2006/0190749 | A1 * | 8/2006 | He et al. | 713/300 |
| 2006/0218428 | A1 | 9/2006 | Hurd | 713/500 |
| 2008/0065920 | A1 * | 3/2008 | Suginaka et al. | 713/324 |
| 2008/0155282 | A1 * | 6/2008 | Gammie et al. | 713/300 |
| 2009/0024862 | A1 * | 1/2009 | Goodnow et al. | 713/340 |

OTHER PUBLICATIONS

Translation of Official Communication from German Patent Office for German Patent Application No. 10 2008 054 067.6 dated May 13, 2009.

* cited by examiner

*Primary Examiner* — Lincoln Donovan
*Assistant Examiner* — Brandon S Cole
(74) *Attorney, Agent, or Firm* — Williams, Morgan & Amerson, P.C.

(57) ABSTRACT

By maintaining a substantially constant total die power during the entire lifetime of sophisticated integrated circuits, the performance degradation may be reduced. Consequently, greatly reduced guard bands for parts classification may be used compared to conventional strategies in which significant performance degradation may occur when the integrated circuits are operated on the basis of a constant supply voltage.

22 Claims, 5 Drawing Sheets

COMPENSATION OF OPERATING TIME-RELATED DEGRADATION OF OPERATING SPEED BY A CONSTANT TOTAL DIE POWER MODE

BACKGROUND OF THE INVENTION

1. Field of the Invention

Generally, the present disclosure relates to sophisticated integrated circuits, such as CPUs including highly scaled transistor elements, and compensation techniques for enhancing product performance.

2. Description of the Related Art

The fabrication of advanced integrated circuits, such as CPUs, storage devices, ASICs (application specific integrated circuits) and the like, requires the formation of a large number of circuit elements on a given chip area according to a specified circuit layout, wherein field effect transistors represent one important type of circuit element that substantially determines performance of the integrated circuits. Generally, a plurality of process technologies are currently practiced, wherein, for many types of complex circuitry, including field effect transistors, MOS technology is currently one of the most promising approaches due to the superior characteristics in view of operating speed and/or power consumption and/or cost efficiency. During the fabrication of complex integrated circuits using, for instance, MOS technology, millions of transistors, e.g., N-channel transistors and/or P-channel transistors, are formed on a substrate including a crystalline semiconductor layer. A field effect transistor, irrespective of whether an N-channel transistor or a P-channel transistor is considered, typically comprises so-called PN junctions that are formed by an interface of highly doped regions, referred to as drain and source regions, with a slightly doped or non-doped region, such as a channel region, disposed adjacent to the highly doped regions.

In a field effect transistor, the conductivity of the channel region, i.e., the drive current capability of the conductive channel, is controlled by a gate electrode formed adjacent to the channel region and separated therefrom by a thin insulating layer. The conductivity of the channel region, upon formation of a conductive channel due to the application of an appropriate control voltage to the gate electrode, depends on the dopant concentration, the mobility of the charge carriers and, for a given extension of the channel region in the transistor width direction, on the distance between the source and drain regions, which is also referred to as channel length. Hence, in combination with the capability of rapidly creating a conductive channel below the insulating layer upon application of the control voltage to the gate electrode, the conductivity of the channel region substantially affects the performance of MOS transistors. Thus, as the speed of creating the channel, which depends on the conductivity of the gate electrode, and the channel resistivity substantially determine the transistor characteristics, the scaling of the channel length, and associated therewith the reduction of channel resistivity and increase of gate resistivity, is a dominant design criterion for accomplishing an increase in the operating speed of the integrated circuits.

Presently, the vast majority of integrated circuits are based on silicon, due to substantially unlimited availability, the well-understood characteristics of silicon and related materials and processes and the technological experience gathered during the last 50 years. Therefore, silicon will likely remain the material of choice for future circuit generations designed for mass products. One reason for the dominant importance of silicon in fabricating semiconductor devices has been the superior characteristics of a silicon/silicon dioxide interface that allows reliable electrical insulation of different regions from each other. The silicon/silicon dioxide interface is stable at high temperatures and, thus, allows the performance of subsequent high temperature processes, as are required, for example, for anneal cycles to activate dopants and to cure crystal damage without sacrificing the electrical characteristics of the interface.

For the reasons pointed out above, in field effect transistors, silicon dioxide is preferably used as a gate insulation layer that separates the gate electrode, frequently comprised of polysilicon or other metal-containing materials, from the silicon channel region. In steadily improving device performance of field effect transistors, the length of the channel region has continuously been decreased to improve switching speed and drive current capability. Since the transistor performance is controlled by the voltage supplied to the gate electrode to invert the surface of the channel region to a sufficiently high charge density for providing the desired drive current for a given supply voltage, a certain degree of capacitive coupling, provided by the capacitor formed by the gate electrode, the channel region and the silicon dioxide disposed therebetween, has to be maintained. It turns out that decreasing the channel length requires an increased capacitive coupling to avoid the so-called short channel behavior during transistor operation. The short channel behavior may lead to an increased leakage current and to a dependence of the threshold voltage on the channel length. Aggressively scaled transistor devices with a relatively low supply voltage and thus reduced threshold voltage may suffer from an exponential increase of the leakage current while also requiring enhanced capacitive coupling of the gate electrode to the channel region. Thus, the thickness of the silicon dioxide layer has to be correspondingly decreased to provide the required capacitance between the gate and the channel region. For example, a channel length of approximately 0.08 μm may require a gate dielectric made of silicon dioxide as thin as approximately 1.2 nm. Although, generally, high speed transistor elements having an extremely short channel may preferably be used for high speed applications, whereas transistor elements with a longer channel may be used for less critical applications, such as storage transistor elements, the relatively high leakage current caused by direct tunneling of charge carriers through an ultra-thin silicon dioxide gate insulation layer may reach values for an oxide thickness in the range or 1-2 nm that may represent limitations for performance-driven circuits. That is, product reliability and lifetime are strongly correlated with short channel effects, i.e., impact ionization and hot carrier injection (HCI) in combination with gate dielectric leakage.

Consequently, significant efforts are made in improving manufacturing technologies in an attempt to achieve a high yield of products meeting predetermined specifications in terms of performance, reliability and lifetime. For example, any improvements with respect to power consumption, which may be associated with the introduction of new technologies, may translate into improved performance only if the power envelope, that is, the area defined by the allowable maximum supply voltage and the maximum thermal power, remains substantially unchanged. Similarly, further device scaling may be correlated with increased operating speed of the product under consideration, while nevertheless increased power consumption may exceed the allowable design power, thereby not taking significant advantage of the reduced dimensions of the components. Hence, also in this case, a product manufactured by highly sophisticated technologies may still have to be considered as a product of the same specification category irrespective of the advanced manufacturing technologies, which may possibly come along with increased production costs. Furthermore, in aggressively scaled semiconductor technology, despite any measures taken to guarantee lifetime and reliability of these products, a generally increased degradation of product performance over operating time may be observed, which may have to be taken into consideration when grouping the various products into specific categories, since the respective product has to meet the specifications over the entire lifetime of the product. For example, in advanced microprocessors, this kind of performance degradation manifests itself in a strong degradation of the maximum operating frequency with increasing operating time.

In order to ensure the desired product performance over the entire product lifetime, for instance ten years for microprocessor products, appropriately selected specifications have to be used in which corresponding safety margins or "guard bands" are included to guarantee that a product having characteristics corresponding to a lower limit of the performance specification may nevertheless stay within the specified range during the entire lifetime. This means that, for instance, microprocessors having a specific initial maximum operating frequency may have to be considered as products of lower speed grade, since the degradation in performance over the entire lifetime may finally result in a reduced maximum operating speed that would no longer be within a category corresponding to a higher speed grade.

FIG. 1a schematically illustrates the temporal progression of product performance, for instance in the form of the maximum operating frequency Fmax of microprocessor products, over the lifetime, such as 10 years, wherein an initial state of the product, indicated as I, may correspond to a certain maximum operating frequency, which decreases or degrades over time so as to arrive at a significantly lower state F representing the performance at the guaranteed lifetime of the product. It should be appreciated that the curve connecting the states I and F is a simplified presentation which, however, qualitatively illustrates the performance degradation of sophisticated integrated circuits.

FIG. 1b schematically illustrates a power envelope representation in which the thermal design power of an integrated circuit is plotted against a performance parameter, such as the maximum operating frequency Fmax of microprocessors, wherein an upper limit for the thermal design power is indicated by TPL. Furthermore, an area A is illustrated in which products are included having a certain maximum operating speed or frequency as determined after fabrication of the devices while also respecting the upper limit TPL of the thermal design power. Furthermore, for the area A, a lower frequency limit is determined that indicates the lowest allowable Fmax so as to specify an actual product speed, indicated as "product speed" for a product segment A. That is, the product speed represents the required performance of the product in actual applications, which is, however, significantly lower than the lower Fmax limit of the area A due to the time dependent performance degradation. However, as explained above with reference to FIG. 1a, the product degradation over time may conventionally be taken into consideration by a corresponding "performance guard band." For example, a product having the maximum operating frequency I after fabrication may have the status F after the lifetime, wherein the status F has to be above the product speed, thereby requiring a moderately wide guard band. Consequently, any products having an initial maximum frequency which is located within the guard band may have to be grouped into a lower product speed segment, thereby reducing the profitability of the entire manufacturing process, as high speed products may typically be sold at higher prices.

As a consequence, reducing the guard band as much as possible may be highly desirable in view of increasing the profitability of the corresponding manufacturing process. In order to increase the number of parts fulfilling high performance requirements, an improvement in technology, for instance the advance to a next technology generation or an improvement in overall product design, may be required but may be associated with significant process modifications resulting in increased research and engineering efforts, thereby contributing to increased production costs.

The present disclosure is directed to various methods and devices that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the subject matter disclosed herein relates to sophisticated integrated circuits and methods for operating the same, wherein a performance degradation over lifetime may be reduced compared to performance degradation occurring in an operational mode with constant supply voltage in that a compensation technique is based on an adaptive control of the supply voltage of the product under consideration based on a target power consumption. The constraints determining product requirements for a given product category are typically related to reliability, power consumption and operating speed or performance, which may be represented in the form of the maximum operating frequency of digital circuitry, such as microprocessor products. The reliability of sophisticated integrated circuits including advanced field effect transistors is strongly related to the lifetime of the gate insulation layer, which is typically provided in the form of a gate oxide layer or other sophisticated dielectric materials, so that the lifetime of the gate insulating layer and the leakage behavior thereof may substantially determine the reliability, for instance in combination with a respective lifetime of the metallization level that is determined by the electromigration behavior of the metallization layers. Lifetime and leakage of the gate insulating layers are substantially determined by the supply voltage (VDD) used for operating the product of a given technology. Thus, there exists an upper limit for the supply voltage which much not be exceeded to guarantee proper product operation during the entire lifetime. On the other hand, the supply voltage may be used as an efficient parameter for controlling performance of the product under consideration, thereby providing the possibility of reducing the "natural" performance degradation caused by a constant voltage operating mode. This may be accomplished by providing a control regime in which a total die power (TDP) may be maintained within set tolerances with respect to an appropriately selected initial total die power. In this substantially "constant total die power" regime, appropriate parameters for indicating the power consumption may be efficiently used to control an adjustable supply voltage without requiring any additional complex control strategies, while nevertheless enabling a narrowing of corresponding performance-related product specifications.

One illustrative method disclosed herein relates to reducing performance degradation of an integrated circuit device. The method comprises determining a value of a parameter indicating a current total die power of the integrated circuit device during operation thereof. Furthermore, the method comprises controlling a supply voltage of the integrated circuit device so as to maintain the current total die power within the range of approximately ±2% of an initial total die power.

A further illustrative method disclosed herein relates to operating an integrated circuit. The method comprises monitoring a power consumption of at least a portion of the integrated circuit over lifetime of the integrated circuit so as to detect a deviation of a current power consumption from a target power consumption. The method additionally comprises increasing power supplied to at least the portion of the integrated circuit when the deviation exceeds a predefined percentage of the target power consumption in order to reduce the deviation.

One illustrative electronic circuit system disclosed herein comprises an integrated circuit to be operated with a target power consumption of at least a specified circuit portion of the integrated circuit. Furthermore, the electronic circuit system comprises a controllable supply voltage source configured to provide an adjustable supply voltage for the integrated circuit on the basis of a control signal. Additionally, the electronic circuit system comprises a control unit configured to establish the control signal so as to control the adjustable supply voltage to maintain a current power consumption of at least the specified circuit portion within a predefined range centered around the target power consumption.

BRIEF DESCRIPTION OF THE DRAWINGS

The disclosure may be understood by reference to the following description taken in conjunction with the accompanying drawings, in which like reference numerals identify like elements, and in which.

Figure 1A:
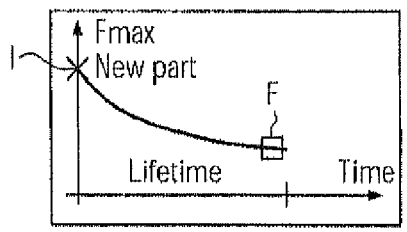
FIGS. 1a-1b schematically illustrate graphical representations of the performance behavior over lifetime of conventional advanced integrated circuits including CMOS transistors operated on the basis of a substantially constant supply voltage.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the subject matter disclosed herein relates to electronic circuit systems and methods for operating the same wherein performance degradation of integrated circuits may be reduced on the basis of a controllable supply voltage, wherein an efficient control strategy may be implemented on the basis of using the "total die power" of the integrated circuit under consideration. As will be explained later on in more detail, upper limits of an allowable range of supply voltages and a corresponding upper limit of a total die power of the integrated circuit under consideration may be respected, while nevertheless an efficient control mechanism may be obtained, since an initially selected appropriate total die power may be maintained throughout the entire lifetime of the integrated circuit with only a very restricted increase of the supply voltage. Consequently, for an appropriately selected initial total die power, the control regime disclosed herein may automatically respect any thermal restriction of the circuit under consideration, while reliability may also be maintained due to the moderately low required additional increase of the supply voltage. Since the respective performance degradation, for instance in terms of maximum operating frequency, may be dynamically reduced during the entire lifetime of the device, the corresponding guard bands used for specifying a certain performance class of a product may be reduced, thereby allowing products to be assigned to a specific performance segment, which would have conventionally been grouped into a less sophisticated product segment. Consequently, the distribution of products in the high performance area may be accomplished on the basis of less narrow tolerance ranges, thereby increasing the number of products that may be assigned to a specific high performance product segment. Thus, not only the profitability of the corresponding technology standard may be increased, but also the overall performance of the products may be enhanced, since the corresponding high performance integrated circuits may be operated with reduced performance loss over the entire lifetime. Corresponding parameter values for estimating the total die power may be readily obtained during operation of the device under consideration, for instance by corresponding current measurement for a known present supply voltage, so that an efficient adaptive control of the supply voltage may be accomplished without requiring any further complex strategies, such as estimating the current performance behavior and the like. It should be appreciated that the term "total die power" as used herein may refer to the power consumption of at least a specified circuit portion at full performance of the circuit portion within a specified range and environmental conditions, for instance with respect to temperature, humidity, air pressure and the like. Thus, the term "total die power" does not necessarily need to refer to the actual overall power consumption of an integrated circuit as a whole, but may represent the "total" power consumption of a performance critical circuit portion, which may be operated with full performance which would then be subject to degradation over the lifetime of the integrated circuit due to corresponding mechanisms as discussed above. Hence, the term "total die power" may represent a well-defined measurable entity, even if the power consumption of a corresponding integrated circuit as a whole may vary due to shutting off of circuit portions and the like. In this case, the "total die power" may be referred to as power consumption of a corresponding fully operating circuit portion or to an operating state in which all circuit portions of integrated circuits are operating at maximum performance.

It should be appreciated that the principles disclosed herein may be applied in the context of advanced integrated circuits including circuit portions based on sophisticated CMOS techniques, such as microprocessors, advanced ASICs (application specific integrated circuits), storage devices and the like, since here significant advances with respect to reducing the overall product spread regarding performance characteristics typically involve great efforts in terms of adaptation of manufacturing processes and circuit designs. The principles disclosed herein, however, may also be applied to any integrated circuit devices in which a significant dependence of performance degradation on supply voltage is observed. Consequently, unless specifically set forth in the specification or the appended claims, the subject matter disclosed herein should not be considered as being restricted to any specific type of integrated circuits.

With reference to FIGS. 2a-2c and 3a-3d, further illustrative embodiments will now be described in more detail, wherein reference may also be made to FIGS. 1a-1b, if appropriate.

Figure 1B:
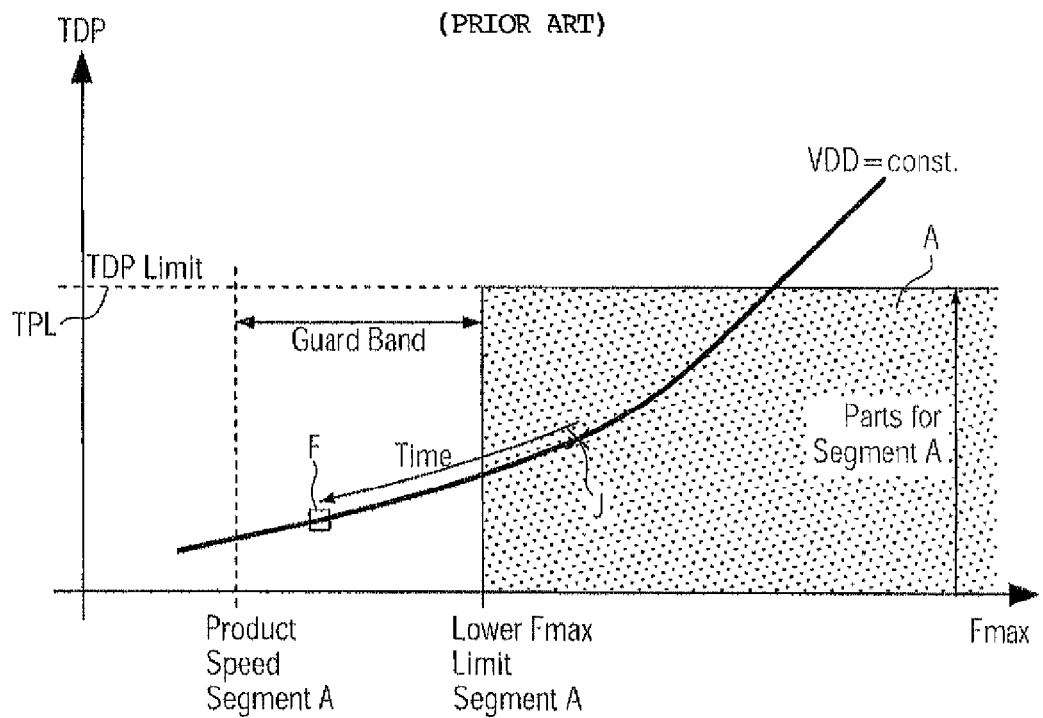

As previously discussed with respect to FIGS. 1a-1b, the maximum operation frequency, in combination with a sufficient guard band, determines the product segment a specific integrated circuit is classified to, wherein the guard bands are selected such that a performance degradation starting from an initial performance characteristic is within the guard band even after the entire lifetime, for instance ten years for advanced microprocessors. Measurements carried out on standard integrated circuits using artificial aging techniques, i.e., techniques for accelerating the aging of the product under consideration, may demonstrate that, for instance, for microprocessors, the reduction in maximal operating frequency corresponds to a shift along a corresponding progression for a specified operating regime, such as a constant supply voltage (see FIG. 1b). This shift of the operating characteristics with respect to maximum operating frequency and total die power may be attributed to the increase in threshold voltage of the respective field effect transistor, wherein the threshold voltage indicates the voltage at which a change of the non-conductive state to the conductive state and vice versa of the transistor occurs. That is, a higher threshold voltage may reduce the drive current in the corresponding transistors for a given supply voltage, wherein, in particular, the reduction of the drive currents is considered a main cause for the performance degradation. According to the subject matter disclosed herein, it is contemplated that the controlled increase of the supply voltage on the basis of a target power consumption may result in a reduction of the performance degradation, thereby providing an efficient means for assigning integrated circuits to a superior product class compared to conventional constant supply voltage operating regimes. Thus, the supply voltage may be adaptively controlled to maintain power consumption, i.e., the total die power in the above-defined sense, close to an appropriately selected initial total die power over the entire lifetime of the device. A corresponding operating regime may also be referred to as a constant total die power (TDP) regime, wherein it should be understood that the term "constant total die power" is to be understood such that the total die power is maintained within the range of approximately ±2% of the initial total die power, and in particular within the range of approximately ±1%.

Figure 2A:
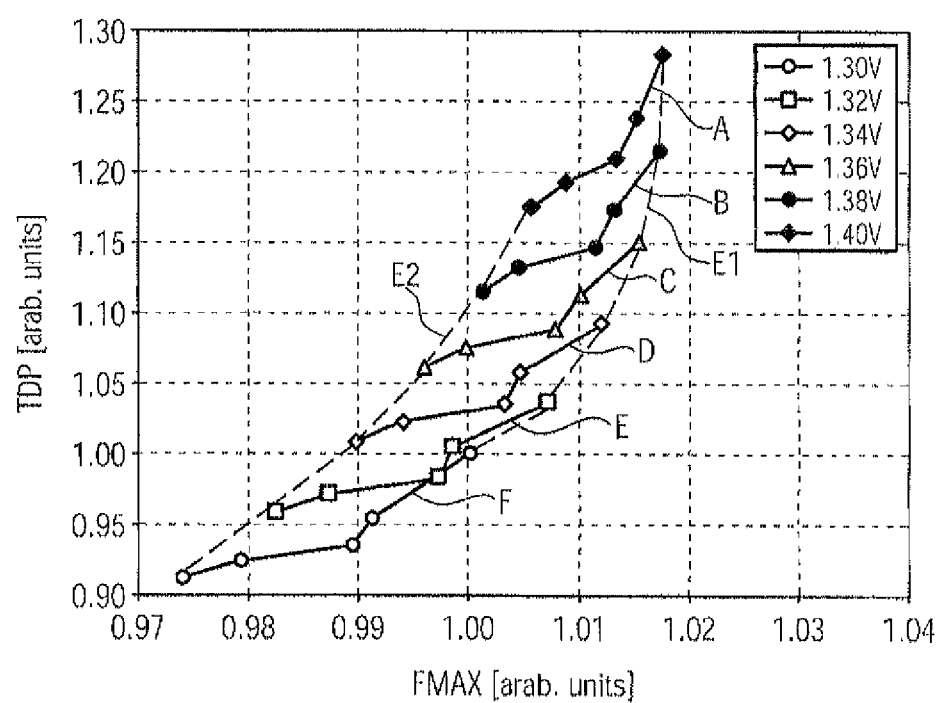
FIG. 2a schematically illustrates a graph illustrating performance degradation process of the total die power for a plurality of different supply voltages, thereby indicating the possibility of providing an enhanced supply voltage control regime on the basis of a substantially constant total die power, according to illustrative embodiments.

FIG. 2a schematically illustrates schematic representations of measurement data that describes the evolution of the total die power (TDP) versus a performance parameter, such as the maximum operating frequency (FMAX) of microprocessors, for a plurality of different operating voltages in the range of 1.30-1.40 V. In FIG. 2a, the vertical axis represents the total die power, i.e., the power consumed by the integrated circuit or a portion thereof when operated at maximum performance in a predefined environment. Typically, an upper limit for the total die power may be selected such that, for a given range of environmental conditions, i.e., heat dissipation capabilities and the like, an operation of the device under consideration may be guaranteed over the entire lifetime with a maximum operating frequency that is determined by the product speed segment, as previously explained. The horizontal axis of FIG. 2a represents the performance parameter, i.e., in the present example, the maximum frequency (FMAX) of the integrated circuit. The measurement points corresponding to curve A represent a corresponding total die power and the associated maximum operating frequency for a voltage of 1.40 V during an artificial aging cycle. For example, the various measurement points may be obtained after specific time intervals when the corresponding integrated circuit devices have been operated at full speed and elevated temperatures. Similarly, curves B-F represent the corresponding measurement data for equivalent integrated circuits operated at voltages of 1.38-1.30 V. As is evident from FIG. 2a, for higher voltages, a corresponding change of the performance parameter is less pronounced for a given variation of the total die power. That is, curve F represents the lowest voltage 1.30 V, wherein the aging of the integrated circuit may result in a change of the total die power of approximately 8%, while the maximum operating frequency may change by about 2.5%. On the other hand, a change of approximately 8-10% in the total die power for curve A that corresponds to 1.40 V may be associated with a change of approximately 1.1% in the maximum operating frequency. Thus, if, for instance, an initial total die power of 1.00 according to the arbitrary units of FIG.

2*a* is selected as an appropriate device condition, a performance degradation of approximately 2.5% may have to be taken into consideration according to conventional strategies with a constant voltage operational mode at the end of the lifetime so that a corresponding wide guard band would be required. On the other hand, it is evident that a moderately small change in the total die power in this area may have a significant effect on the maximum operating frequency. Thus, maintaining the total die power within the restricted range centered around the desired total die power over the entire lifetime of the device under consideration may result in a "transition" from curve F to a neighboring curve, such as curve E. It should be appreciated that corresponding curves may be readily obtained by interpolation or by providing additional measurement data, thereby obtaining a corresponding envelope, as indicated by the dashed lines E1 and E2. For example, E1 may represent a curve connecting the starting points of each of the curves A-F, while E2 is a curve representing the end points of the curves A-F. Consequently, the envelope E1, E2 may represent the entirety of corresponding performance degradation curves that may correspond to any intermediate supply voltage values. Thus, by using a substantially constant total die power, a corresponding appropriate supply voltage may be readily determined on the basis of the envelope E1, E2 which may then correspond to a corresponding curve A-F or any intermediate curves (not shown), which may finally determine the endpoint on curve E2. Consequently, in this operating scenario, a corresponding endpoint may be obtained on curve E2 which may have a higher maximum operating frequency at the end of the lifetime compared to the endpoint of a corresponding curve associated with a constant voltage regime.

Figure 2B:
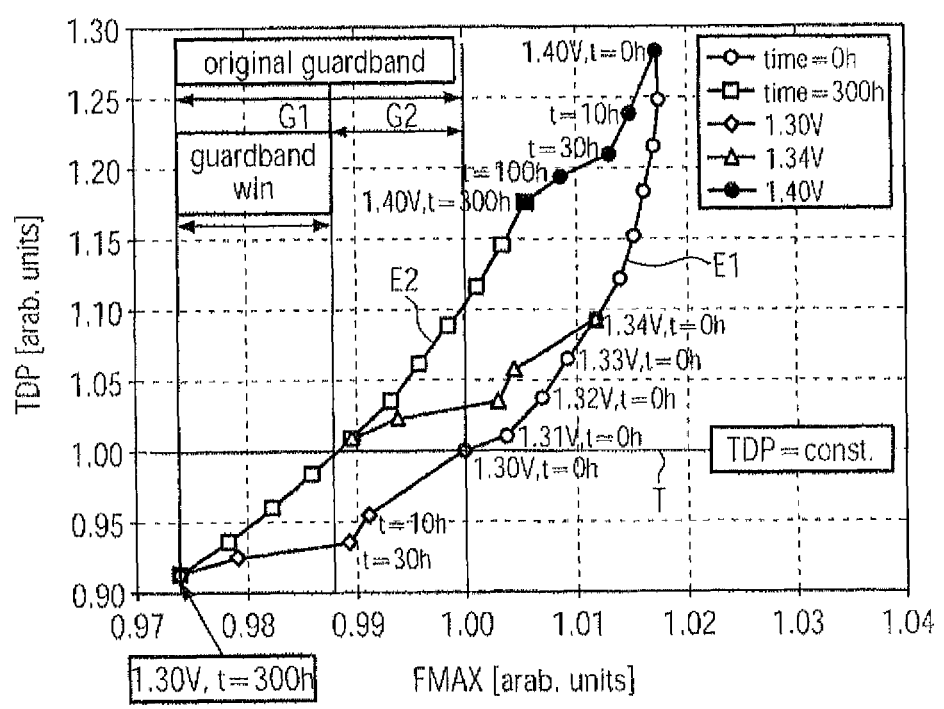
FIG. 2b schematically illustrates an envelope of plots of the total die power versus a performance parameter for different supply voltages, thereby indicating a constant total die power regime, according to illustrative embodiments.

FIG. 2*b* schematically illustrates a graph in which the envelopes E1 and E2 are illustrated on the basis of the same measurement data as is also used in FIG. 2*a*. Furthermore, a corresponding guard band G1 is illustrated for a desired initial total die power corresponding to a supply voltage of 1.30 V (curve F of FIG. 2*a*). In this case, the width of the guard band G1 is determined by the maximum operating frequency at the end of the specified lifetime, which in the present example corresponds to an accumulated operating time of 300 hours at elevated temperatures. Furthermore, as illustrated, a constant total die power regime is indicated, for instance by the horizontal line T, wherein an intersection of curve T and the envelope E2 determines a corresponding maximum operating frequency at the end of the lifetime of the device under consideration when the total die power is maintained constant by appropriately controlling the supply voltage. In this case, the corresponding guard band G2 has a significantly reduced width, since only a change of the maximum operating frequency of 1.2% is caused by the performance degradation compared to approximately 2.5% for the constant voltage mode that defines the guard band G1. Consequently, a corresponding upper limit of a product speed may be selected respectively higher corresponding to the guard band G2 or a lower limit of a maximum operating frequency for a given initial supply voltage for the integrated circuits under consideration may be selected lower, thereby obtaining a greater number of products which may meet the specifications for a given electronic product. Furthermore, the scenario with a substantially constant total die power may be accomplished on the basis of varying the supply voltage only by 37 mV in the example shown in FIG. 2*b*, so that only a very restricted increase of the supply voltage may be required. Thus, corresponding limits with respect to reliability of the integrated circuits may be respected, while nevertheless providing a highly efficient reduction of the performance degradation. A corresponding scenario may be efficiently used in the categorization of integrated circuits by selecting an appropriate initial supply voltage that corresponds to the total die power constraints. That is, any integrated circuit that may be driven to the initial total die power limit at an initial supply voltage that may provide a moderately low range of voltage increase so as to respect the upper supply voltage limits may be efficiently assigned to the corresponding product class having a reduced guard band due to the constant total die power regime. The adaptive control of the supply voltage may be efficiently implemented by providing corresponding measurement data during operation of the device and generating an appropriate control signal for adjusting the output voltage of a controllable supply voltage source. In this case, without any further efforts, the associated benefit with respect to reduced performance degradation may be accomplished.

Figure 2C:
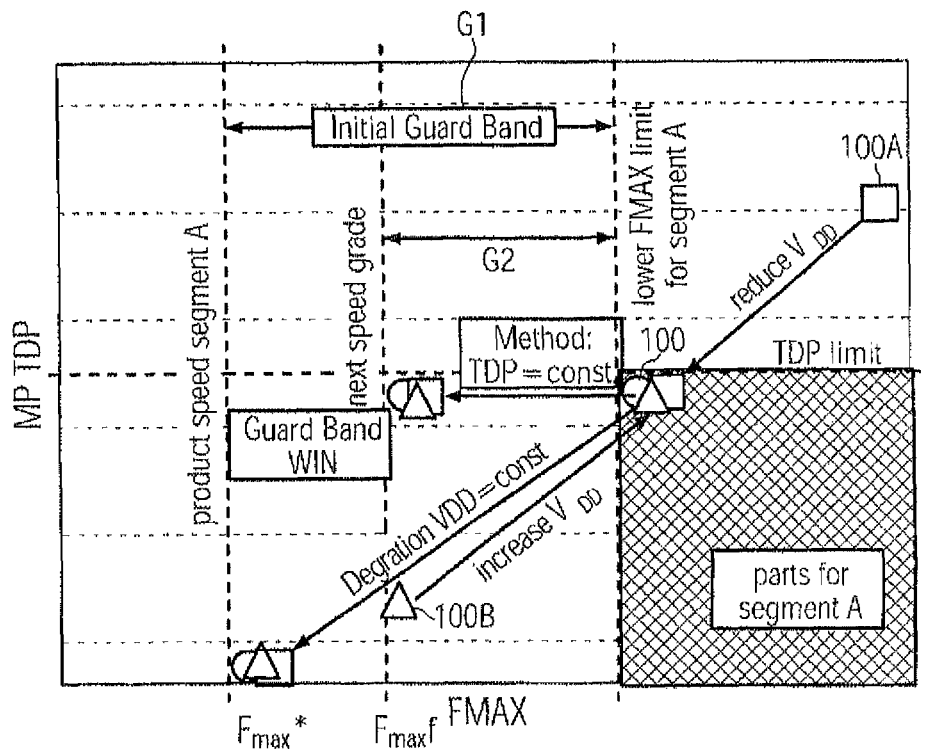
FIG. 2c schematically illustrates a graphical representation for comparing a conventional constant supply voltage regime with a "constant" total die power regime, according to illustrative embodiments.

FIG. 2*c* schematically illustrates a graph in which application of a corresponding control regime is illustrated. As shown, the most critical area for integrated circuits corresponding to the segment A is represented by a device 100 positioned in the uppermost left corner of the corresponding segment A. That is, the device 100 may represent a device which is at the lower limit of the performance parameter FMAX and which is also at the upper limit of the desired or target total die power. It should be appreciated that any other device in the corresponding segment may be less critical since, for instance, any device positioned further to the right may have a higher initial maximum operating frequency and hence degradation thereof is less critical. Hence, a device positioned below the device 100 within the segment A may be readily operated at a higher supply voltage, thereby also increasing the total die power, which is, however, also associated with a corresponding increase of the maximum operating frequency. Thus, such devices may be driven to the TDP limit as long as the limits for the maximum supply voltage are respected. Moreover, as previously explained with reference to FIGS. 2*a*-2*b*, according to a conventional scenario for operating the device 100, a corresponding degradation may result in a maximum operating frequency $F_{max}^*$, which in turn may define the maximum product speed corresponding to segment A when a constant supply voltage is used over the entire lifetime of the device 100. By maintaining the total die power within a specific range centered around the initial total die power, which may also be referred to as a constant total die power approach, the resulting maximum operating frequency after the end of the lifetime, indicated as $F_{max}f$, may be significantly higher compared to the conventional maximum operating frequency $F_{max}^*$, as previously explained. Consequently, the corresponding product speed for the segment A may be selected at $F_{max}f$, thereby significantly increasing performance of the final products for the given segment A. Moreover, a further integrated circuit device 100A may have device characteristics which may correspond to a high maximum operating frequency while also the total die power may be significantly higher for a given initial supply voltage. In this case, the device 100A may be assigned to a reduced supply voltage, which may thus reduce the maximum operating frequency and also the total die power so that the device 100A may correspond to the device 100 with respect to maximum operating frequency and total die power, however, at a reduced initial supply voltage. Consequently, the device 100A may also be operated in the constant total die power regime, thereby obtaining a similar overall performance as for the device 100. Consequently, the device 100A may be efficiently distributed into the required product segment as illustrated in FIG. 2*c*, if desired, by appropriately selecting the initial supply voltage in order to obtain the initial target total die power. In other cases, integrated circuits limited by their maximum operating frequency, such as a device 100B, may also be shifted into the desired corner of the segment A by increasing the initial supply voltage to be used during the operation of the device 100B, as long as the increase in supply voltage and a corresponding increase during the entire operating lifetime may be accomplished within a value range that is compatible with the reliability constraints for the maximum applicable supply voltage, as previously discussed. Thus, the device 100B that may conventionally be excluded for the segment A may be distributed into the segment A by adjusting the target total die power and operating the device 100B according to the constant total die power regime, thereby meeting the specifications for the reduced guard band G2. For example, for sophisticated microprocessors based on CMOS technology including transistor elements of critical dimensions of approximately 50 nm and less, the guard band G1 corresponding to the conventional constant voltage approach may be reduced by approximately 50-60% by operating the devices within a predetermined range of the initial or target total die power.

Figure 3A:
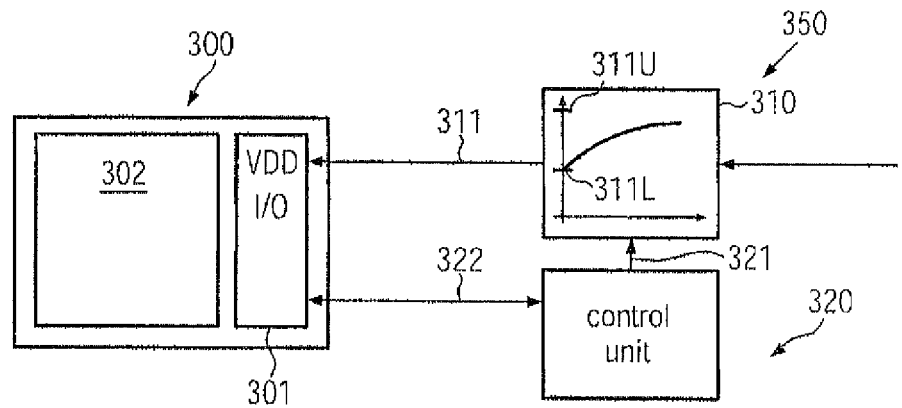
FIGS. 3a-3c schematically illustrate a circuit system having implemented therein a "constant" total die power operational mode, according to further illustrative embodiments.

FIG. 3a schematically illustrates an electronic circuit system 350 comprising an integrated circuit 300, a controllable supply voltage source 310 and a control unit 320 according to illustrative embodiments. The integrated circuit device 300 of the circuit system 350 may represent any advanced semiconductor device, as previously explained. In some illustrative embodiments, the device 300 may represent an advanced CPU, which may comprise one or more device portions, such as CPU cores, memory areas, I/O (input/output) areas and the like. For instance, the integrated circuit 300 may comprise an I/O portion 301 that is configured to provide signals to peripheral devices (not shown) and to receive signals from other components, for instance from the supply voltage source 310. The integrated circuit 300 may further comprise a circuit portion 302 including any functional blocks according to the desired circuit layout. The circuit portion 302 may communicate with the I/O portion 301 for exchanging signals, supply voltages and the like. It should be appreciated that the integrated circuit 300 may be formed on the basis of a common semiconductor material so that the I/O portion 301 and the internal circuit portion 302 may be formed on the basis of a common manufacturing process for fabricating circuit elements, such as field effect transistors, capacitors, contact pads and the like. The integrated circuit 300 may be provided in a specific package (not shown) which provides for heat dissipation capabilities wherein a specified thermal power generated in the device 300 during operation may be dissipated via the package on the basis of appropriately defined environmental conditions. Thus, the total die power may be selected in accordance with specific and environmental conditions at which the corresponding heat emitted during full operation of the device 300 may be reliably dissipated.

The supply voltage source 310 may be provided in any appropriate form so as to enable the generation of a very stable yet controllable supply voltage 311. The voltage source 310 may be configured to provide the supply voltage 311 within an allowable range of supply voltages having a lower limit 311L and an upper limit 311U, wherein the output voltage 311 may be resolved to maintain the total die power within the specified range, for instance within ±2% of the initially selected total die power, or even within 1% of the initially selected total die power. For instance, the supply voltage 311 may have to be varied during the entire lifetime of the device 300 in a range of several tenths of microvolts, as previously discussed. It should be appreciated that the term "stable" in the context of the supply voltage 311 is to be understood such that the supply voltage 311 corresponds to a control signal 321 and maintains its value, except for device specific variations of the voltage source 310, as long as the control signal 321 instructs the voltage source 310 to provide the same voltage level. It should further be appreciated that respective minute variations of the control signal 321 may also be included in the term "stable" supply voltage. The voltage source 310 may be comprised of any appropriate components, such as switched-up and/or switched-down converters, linear regulators and the like. In some illustrative embodiments, the voltage source 310 may be provided as an external component with respect to the integrated circuit 300, i.e., the circuit elements of the voltage source 310 may be formed in a separate carrier material or may represent a separately operating voltage source unit, while in other cases one or more components of the voltage source 310 may be formed commonly with any circuit elements of the integrated circuit 300, thereby enhancing the overall manufacturing process. Respective circuit components, such as inductors, capacitors and the like, which may be difficult to be integrated into the device 300, may be provided as external components in this case.

The control unit 320 may be configured to establish the control signal 321 on the basis of a corresponding monitor signal 322, which is indicative of a parameter for representing the total die power. For example, the power consumption of the integrated circuit 300 may be assessed on the basis of the current supply voltage 311, for instance by determining a corresponding current drawn by the device 300, while the monitor signal 322 may indicate whether the actual state of operation of the device 300 may correspond to a state in which the total power consumption of the device 300 may be representative for the total die power. In other cases, the monitor signal 322 may itself represent the total die power, which may be obtained on the basis of an internal circuit portion of the device 300 that may be appropriately configured so as to allow the determination of the power consumption of a specific circuit portion which is representative for a fully operating part of the device 300. That is, a corresponding fully operating part may thus represent a device internal portion, which may exhibit a corresponding aging behavior, as previously explained. In other cases, the monitor signal 322 may represent a corresponding voltage signal representing the total die power, which may then be evaluated by the control unit 320 in order to establish an appropriate state of the control signal 321 that may in turn result in a modified supply voltage 311, which in turn may contain the total die power at the initial or target value.

Figure 3B:
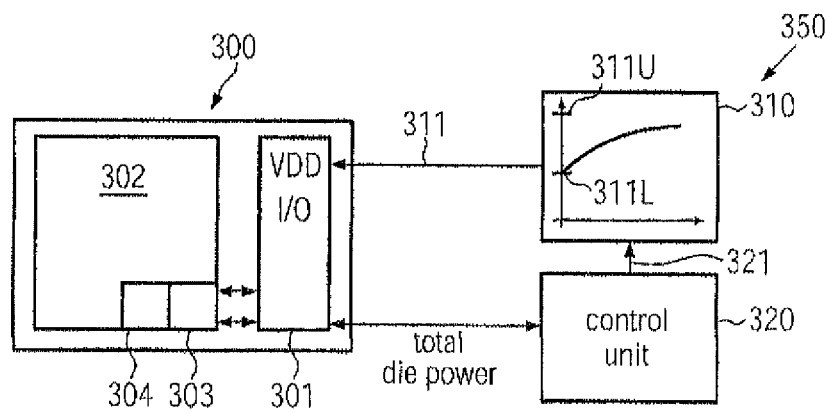

FIG. 3b schematically illustrates the electronic circuit system 350 according to further illustrative embodiments. As shown, the integrated circuit 300 may comprise a dedicated test portion 303 that may be operated with maximum performance, for instance by providing an appropriately designed oscillator or any other appropriate test circuitry. Furthermore, the dedicated test portion 303 may be coupled to a measurement portion 304 configured to estimate the power consumption of the dedicated test portion 303. For instance, the portion 304 may comprise circuit components, such as resistors, transistors and the like, which may be appropriate for reliably determining the power consumption and thus to estimate the total die power, which may be communicated to the control unit 320. For this purpose, the portions 303 and 304 may communicate with the control unit 320 via the I/O interface 301, wherein, in some illustrative embodiments, one or both of the portions 303 and 304 may be activated by the control unit 320 at any appropriate time. Consequently, during operation of the electronic circuit system 350, the control unit 320 may obtain information with respect to the total die power in a device internal manner, thereby reducing the necessity for additional components in the system 350. It should be appreciated that at least the circuit components in the measurement portion 304 may comprise devices which may have a significantly less pronounced aging behavior compared to the dedicated test portion 303. Consequently, the resulting measurement data representing the total die power may be representative for the status in the dedicated test portion 303, which in turn may represent the functional status of speed critical circuit portions of the device 302, whereas an influence of the aging behavior of the measurement portion 304 may be negligible. For example, respective resistors for measuring the magnitude of current may be formed such that performance degradation thereof may be less pronounced compared to the degradation caused by variations in transistor characteristics, as previously discussed. Similarly, the measurement portion 304 may include a circuitry in which the evaluation of the measurement results may not be substantially affected by the aging of the corresponding transistor elements. For example, the digitizing of corresponding voltage and current signals may not be substantially affected by the actual state of corresponding transistor elements formed in the measurement portion 304. Consequently, die internal measurement results with respect to the total die power may be supplied to the control unit 320 substantially without being affected by device aging in the portion 304.

Figure 3C:
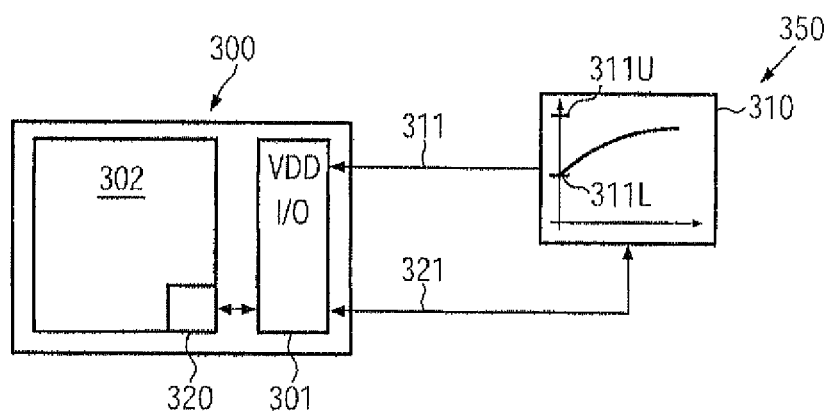

FIG. 3c schematically illustrates the electronic circuit system 350 according to further illustrative embodiments in which the control unit 320 may be integrated into the integrated circuit 300, i.e., the control unit 320 and the portions 302 and 301 may be formed on the basis of a common semiconductor material layer so that the same manufacturing techniques and processes may be applied to the portions 301 and 302 and to the control unit 320. It should be appreciated that the control unit 320 may represent an integrated part of the portion 302 and may also be used for other purposes, such as performing user applications and the like. For example, the control unit 320 may be implemented in a microprocessor without significant hardware configurations except for the capability of generating the control signal 321. In some illustrative embodiments, the control unit 320 may have incorporated therein the portions 303 and 304 (FIG. 3b) so as to obtain appropriate measurement data with respect to the total die power, as is also explained with reference to FIG. 3b.

As a result, the present disclosure provides devices and techniques that enable a reduction of performance degradation of integrated circuits over the entire lifetime by appropriately increasing the supply voltage such that the total die power may be maintained within a predefined range. In illustrative embodiments, any variations of the total die power may be less than approximately 2% of the initial or target total die power or the range may be defined by approximately 1% of the target total die power. A corresponding "constant" total die power control regime may enable a significant reduction of corresponding guard bands upon classification of the integrated circuits. The total die power may be monitored during operation of the integrated circuit on the basis of any appropriate measurement data that may be obtained in a substantially continuous manner or on the basis of appropriately selected time intervals during the entire lifetime of the device. Based on the measurement data, an appropriate control of the supply voltage may be performed, wherein a corresponding total "voltage swing" of the supply voltage over the entire lifetime may be in the range of several tenths of microvolts, thereby also efficiently respecting any upper limits for the supply voltage. Thus, the constant total die power control regime may be efficiently implemented without unduly adding to overall process complexity of a corresponding electronic circuit system, while at the same time the number of integrated circuits that may be used for a specified performance category may be significantly increased without requiring significant adaptations of manufacturing processes and without any design changes. Due to the reduced performance degradation over lifetime of an integrated circuit, the respective guard bands for classifying the integrated circuits may be reduced, thereby providing the potential for obtaining higher prices for integrated circuits that may conventionally be classified in less sophisticated categories, which finally translates into higher profitability of a given manufacturing technology.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of reducing performance degradation of an integrated circuit device, the method comprising:
   during operation of said integrated circuit device, determining a value of a parameter indicating a current total die power, wherein the total die power indicates the power consumed by a specified circuit portion of said integrated circuit device during operation of said integrated circuit device; and
   controlling a supply voltage of said integrated circuit device to maintain said current total die power within a range of approximately plus/minus 2% of an initial total die power.

2. The method of claim 1, wherein said value of said parameter is updated at least several times over an operational lifetime of said integrated circuit device.

3. The method of claim 1, further comprising selecting a target total die power of said integrated circuit device for said initial total die power by adjusting an initial supply voltage on the basis of said target total die power.

4. The method of claim 3, wherein adjusting said initial supply voltage comprises determining a parameter value of a performance characteristic of said integrated circuit device and increasing a nominal supply voltage up to said initial supply voltage on the basis of said target total die power.

5. The method of claim 4, wherein determining said performance characteristic comprises measuring an operating speed of an internal circuit portion of said integrated circuit device.

6. The method of claim 4, further comprising assigning said integrated circuit device to a predefined performance category when said performance characteristic is above a predetermined threshold and said initial total die power is below a critical total die power for said increased nominal supply voltage.

7. The method of claim 1, wherein controlling said supply voltage is performed by a device internal supply voltage source.

8. The method of claim 1, wherein controlling said supply voltage is performed by an external supply voltage source.

9. The method of claim 1, wherein determining said value of said parameter is performed by an external circuitry.

10. The method of claim 1, wherein determining said value of said parameter is performed by a device internal circuit portion of said integrated circuit device.

11. The method of claim 1, wherein a deviation from said initial total die power is approximately 1% or less.

12. A method of operating an integrated circuit, the method comprising:
monitoring a power consumption of at least a portion of said integrated circuit over a lifetime of said integrated circuit so as to detect a deviation of a current power consumption from a target power consumption; and
increasing power supplied to at least said portion when said deviation exceeds a predefined percentage of said target power consumption so as to reduce said deviation.

13. The method of claim 12, wherein said predefined percentage is approximately 2% or less.

14. The method of claim 13, wherein said predefined percentage is approximately 1% or less.

15. The method of claim 12, wherein controlling power supplied to said at least a portion comprises controlling a supply voltage of said integrated circuit.

16. The method of claim 15, further comprising selecting an initial supply voltage on the basis of said target power consumption and a lower limit of a performance parameter of said integrated circuit.

17. The method of claim 16, wherein selecting said initial supply voltage comprises increasing a nominal supply voltage of said integrated circuit when a measured value of said performance parameter at said nominal supply voltage is below said lower limit.

18. The method of claim 16, wherein selecting said initial supply voltage comprises reducing a nominal supply voltage of said integrated circuit when a measured value of said performance parameter at said nominal supply voltage is above said lower limit and a power consumption of at least said portion is above said target power consumption at said nominal voltage.

19. An electronic circuit system, comprising:
an integrated circuit to be operated with a target power consumption of at least a specified circuit portion of said integrated circuit;
a controllable supply voltage source configured to provide an adjustable supply voltage for said integrated circuit on the basis of a control signal; and
a control unit configured to establish said control signal to control said adjustable supply voltage to maintain a current power consumption of at least said specified circuit portion within a predefined range centered around said target power consumption.

20. The electronic circuit system of claim 19, wherein said predefined range is approximately 2% or less of said target power consumption.

21. The electronic circuit system of claim 20, wherein said predefined range is approximately 1% or less of said target power consumption.

22. The electronic circuit system of claim 19, wherein said integrated circuit and said control unit are formed on a common semiconductor material.

* * * * *